(12) United States Patent
Panasik (10) Patent No.: US 6,219,553 B1
(45) Date of Patent: Apr. 17, 2001

(54) LOW POWER WIRELESS NETWORK USING DESKTOP ANTENNA

(75) Inventor: Carl M. Panasik, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/829,563

(22) Filed: Mar. 31, 1997

(51) Int. Cl.[7] .................................................. H04Q 7/20
(52) U.S. Cl. .......................................... 455/446; 445/562
(58) Field of Search ................................. 455/41, 62, 63, 455/67.2, 67.6, 446, 561, 562; 342/432, 434; 343/767, 905

(56) References Cited

U.S. PATENT DOCUMENTS

| 3,912,875 | * | 10/1975 | Katz | 455/561 |
| 4,325,141 | * | 4/1982 | Ghose | 455/63 |
| 5,285,494 | * | 2/1994 | Sprecher et al. | 455/446 |
| 5,617,102 | * | 4/1997 | Prater | 342/432 |
| 5,818,822 | * | 10/1998 | Thomas et al. | 455/14 |
| 5,828,944 | * | 10/1998 | Uppaluri et al. | 455/446 |

OTHER PUBLICATIONS

"Radiax Radiating Cables for Wireless Communications," Andrew Corporation (1996).
"Andrew Corporation Opens Tunnel Test Facility in Denton, Texas", Andrew Corporation (1997).

* cited by examiner

Primary Examiner—Reinhard Eisenzopf
Assistant Examiner—Sam Bhattacharya
(74) Attorney, Agent, or Firm—Ronald O. Neerings; Frederick J. Telecky, Jr.

(57) ABSTRACT

A network of electronic devices such as computers (50) and/or calculators (36, 38) uses low power communication to transmit wireless signals through a distributed antenna system (40). The distributed antenna system may be formed in conjunction with ceiling or floor tiles 62 or modular office components (44 and 46) or student desks. The distributed antenna system 40 reduces the effective distance between a transmitting and receiving device to a nominal distance.

18 Claims, 5 Drawing Sheets

LOW POWER WIRELESS NETWORK USING DESKTOP ANTENNA

CROSS-REFERENCE TO RELATED APPLICATIONS

This application is related to U.S. application. Ser. No. 08/706,123 to Siep et al, filed Aug. 30, 1996, entitled "Active Wireless Network For Calculators," U.S. application. Ser. No. 08/707,165 to Siep et al, filed Aug. 30, 1996, entitled "Passive Wireless Network For Calculators," U.S. application. Ser. No. 08/697,808 to Siep et al, filed Aug. 30, 1996, entitled "Method of Implementing a Network in a Classroom Setting," U.S. application. Ser. No. 08/753,563 to Siep et al, filed Nov. 26, 1996, entitled "Method and Apparatus for Low Power Communications Between Mobile Computing Devices," and U.S. application. Ser. No. 08/829,278, to Panasik et al, filed concurrently herewith, entitled "Low Power Wireless Network."

STATEMENT OF FEDERALLY SPONSORED RESEARCH OR DEVELOPMENT

Not Applicable

BACKGROUND OF THE INVENTION

1. Technical Field

This invention relates in general to mobile computing electronic devices and, more particularly, to a method and apparatus for wireless communications between mobile computing electronic devices.

2. Description of the Related Art

Mobile computing electronic devices, such as electronic calculators and portable computers, have evolved significantly in recent years. In addition to arithmetic calculations, current day calculators often provide programming and graphing functions. Graphing calculators include a screen able to display graphics in addition to alphanumeric characters. Portable computers, on the other hand, are progressively becoming more mobile, as the weight of the computer is reduced, while maintaining processing capabilities at the same level as desktop computers.

For some time, graphing calculators and portable computers have been able to communicate to one another through a wired connection. An example of a calculator of this type is the TI-92 calculator produced by Texas Instruments Incorporated of Dallas, Tex. Wired connections may be used, for example, in a classroom setting where problem sets are downloaded from the teacher's calculator to the students' calculators. Once downloaded, the students can use the calculator to solve the problem. Teacher's can review the student's answers in real-time to determine which students are having difficulty solving the problems.

Portable computers also can communicate through computer networks. Recently, wireless networks have become available for computers. A great advantage of a wireless network is the ability to maintain a network connection within a defined area with a portable computer without losing the mobility of the computer. Wireless networks for graphing calculators have been proposed in U.S. application. Ser. No. 08/706,123 to Siep et al, filed Aug. 30, 1996, entitled "Active Wireless Network For Calculators," U.S. application. Ser. No. 08/707,165 to Siep et al, filed Aug. 30, 1996, entitled "Passive Wireless Network For Calculators," U.S. application. Ser. No. 08/697,808 to Siep et al, filed Aug. 30, 1996, entitled "Method of Implementing a Network in a Classroom Setting," and U.S. application. Ser. No. 08/753,563 to Siep et al, filed Nov. 26, 1996, entitled "Method and Apparatus for Low Power Communications Between Mobile Computing Devices," all of which are incorporated by reference herein.

Despite the advantages of networks in non-commercial setting such as classrooms, they have not been accepted in widespread use. Wired connections between calculators is somewhat inhibiting to the students. Wireless communications in a classroom or auditorium has several problems. First, in order to have effective communication between the teacher and the students, the student devices must have sufficient battery power to transmit a signal that will reach the teacher's calculator. Unfortunately, designing student devices with enough transmitted power to reach the teacher's desk in a normal sized classroom would deplete the smaller calculator batteries at an unacceptable rate. This is a particular problem with calculators which have relatively small batteries and would, without the wireless communications, last for approximately eight months. Adding wireless communications could decrease the battery life to a single month or less in normal use. Second, it is desirable that the devices operate in a frequency band which is designated as unlicensed by the FCC (Federal Communications Commission). In order to prevent interference between devices operating in an unlicensed frequency band (the ISM—Industrial, Scientific and Medical—band), the FCC has strict guidelines on the spread spectrum modulation schemes which must be used, if the devices broadcast at a power equal or greater than 0.7 milliwatts. Current day wireless transmission devices must exceed this level to accurately communicate over distances up to thirty meters; therefore, they must use a spread spectrum modulation scheme approved by the FCC which increases the complexity, cost and power consumption of the system.

Accordingly, a need has arisen in the industry for a low cost, low power, method and apparatus for communicating between mobile computing electronic devices.

BRIEF SUMMARY OF THE INVENTION

The wireless communications system of the present invention comprises a plurality of mobile computing electronic devices having circuitry for receiving and sending data by wireless communications and a distributed antenna system. The distributed antenna system has one or more segments extending proximate to the mobile computing electronic devices to provide a low loss propagation path for the wireless communication signals.

In a first embodiment of the invention, antenna segments are formed on desks and/or other furniture.

In a second embodiment of the invention, antenna segments are formed on ceiling or floor tiles of the type normally used in an office environment.

The present invention provides significant advantages over the prior art. The power requirement reduction afforded by the distributed antenna system significantly reduces the power used by a portable computer or other mobile computing electronic device to communicate using a wireless transmission. Further, the distributed antenna system eliminates the effect of obstructions between a portable computer and a receiving device which can block communications. Another advantage of the distributed antenna system is that the number of wireless network access points in a computer network can be greatly reduced, since the distance between a mobile computing electronic device and a network access point is effectively the distance between the mobile computing electronic device and the nearest antenna segment, regardless of the physical distance between the access point and the mobile computing electronic device. In classroom situations, the distance between the student calculators and the teacher's calculator can be any length, because the effective distance between the calculators is the distance between the calculators and the nearest antenna segment. For wireless network systems, the design and cost of access points can be greatly reduced due to a simpler modulation/demodulation scheme and, in some instances, dedicated access points can be used to reduce conflicts caused by multiple access in the time and frequency domains.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1–6 of the drawings, like numerals being used for like elements of the various drawings.

Figure 1A:
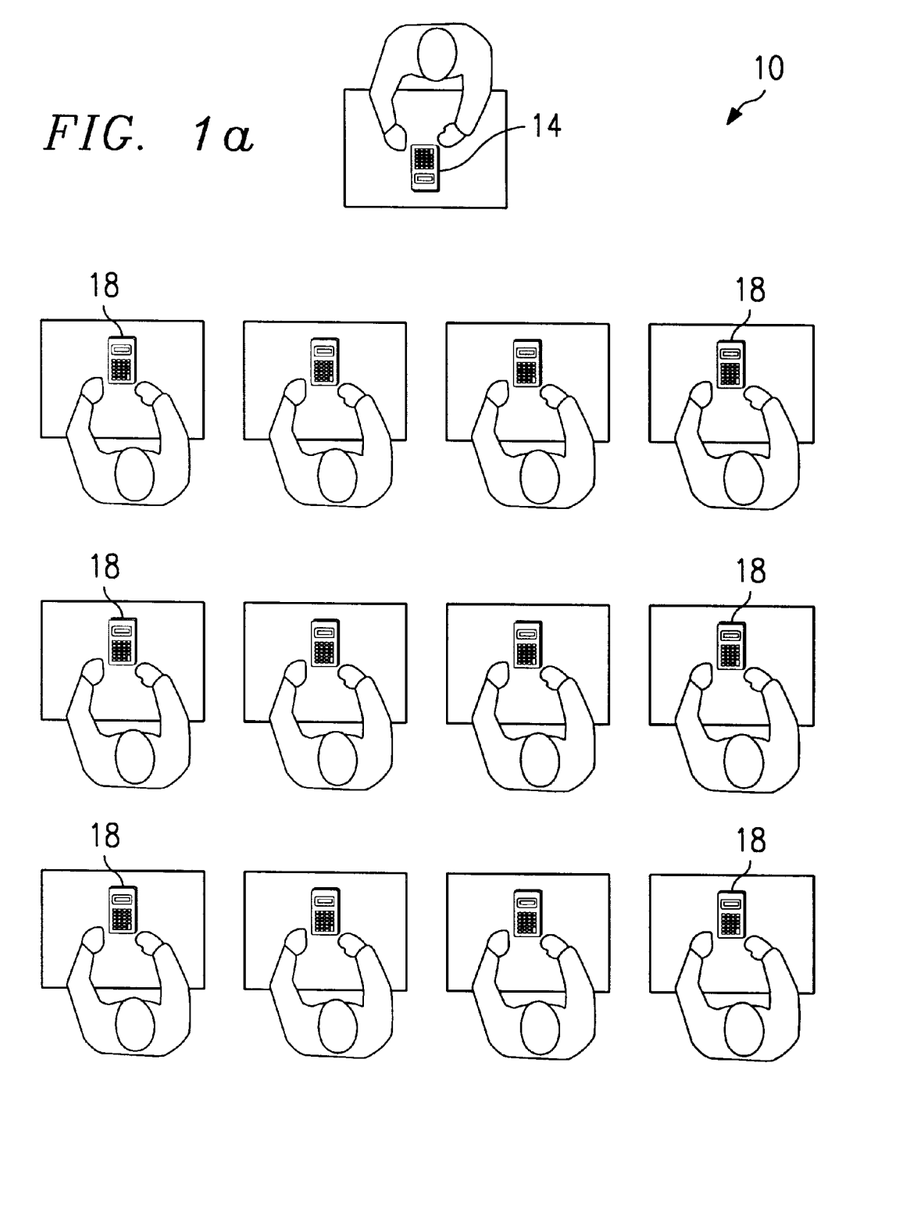
FIGS. 1a–b illustrate typical settings where wireless communication signals are desirable, but may suffer from non-trivial power requirements associated with wireless communications.
Figure 1B:
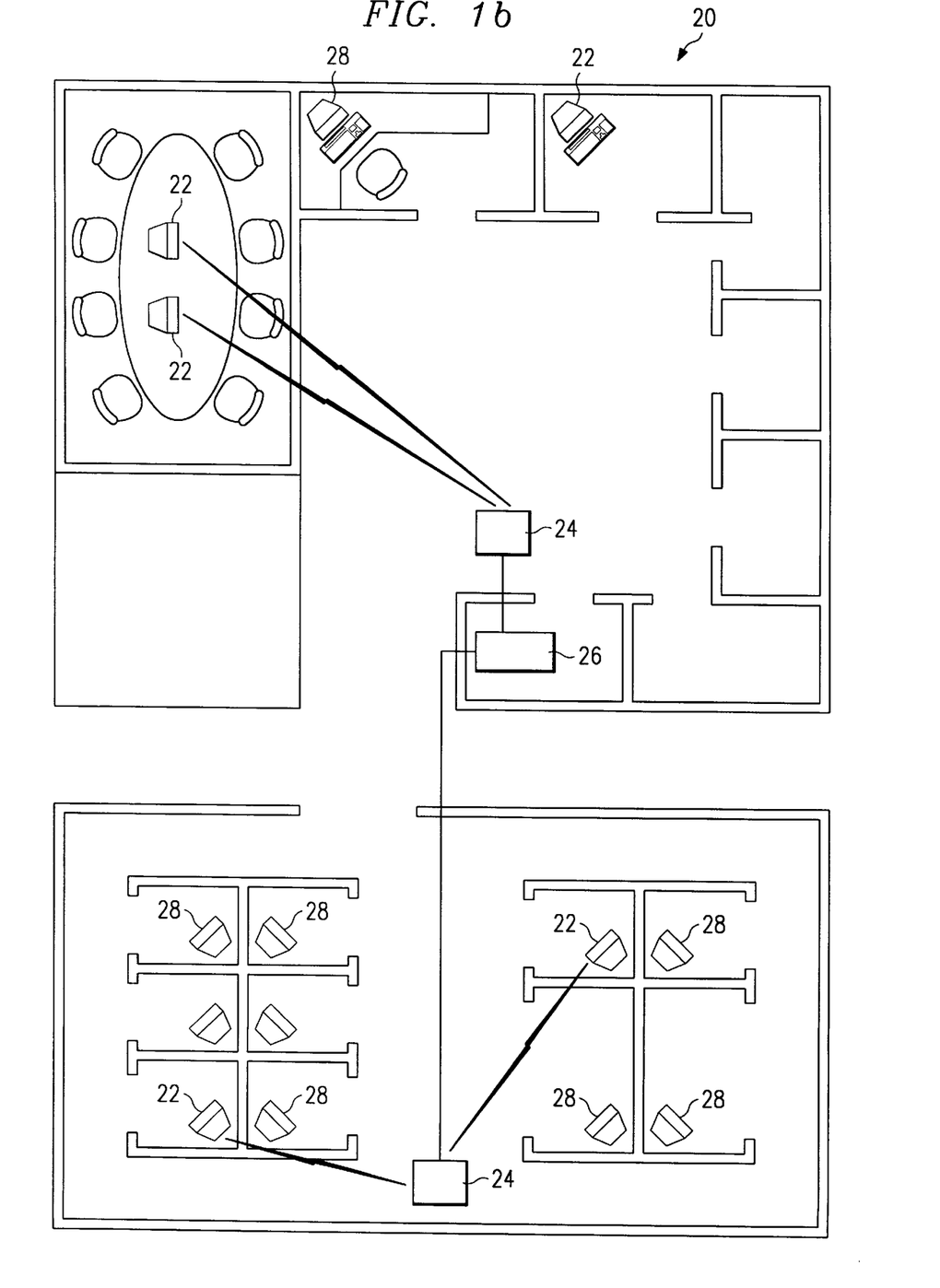

FIGS. 1a and 1b illustrate room configurations which can be used with a network of mobile computing electronic devices, such as notebook computers, personal digital assistants (PDAs), graphing calculators and similar devices. In FIG. 1a, a classroom network setting 10 is shown with a teacher calculator 14 in communication with a plurality of student calculators 18 spread out around the room. Each student calculator 18 has the ability to receive data from the teacher calculator 14 and to send data to the teacher calculator 14. Additionally, the student calculators may be able to communicate between themselves. Wireless networks for such an arrangement are discussed in U.S. Pat. application. Nos. 08/706,123, 08/707,165, 08/697,808 and 08/753,563 to Siep et al, referenced above.

Use of networked calculators in settings as shown in FIG. 1a has significant benefits. Problem sets can be downloaded to the student calculators 18 from the teacher calculator 14, with answers uploaded and graded automatically. Further, student responses can be evaluated as class is conducted to inform the teacher whether the students are grasping the principles as they are being taught. The possibilities of networked calculators, or other low cost mobile computing electronic devices, are endless for providing improved teaching and more efficient use of teacher time.

One factor which limits the use of a mobile computing electronic device in a classroom setting is the power required for accurate communications between the student and teacher calculators (or between student calculators). In the vast majority of situations, the calculators will be owned by or assigned to respective students and travel with the students from class to class. Accordingly, in a classroom situation, the calculators must be able to communicate without restrictions on their location or arrangement in the classroom. Each student calculator must have sufficient power to communicate from the furthest (or worst case) point in the classroom to the teacher calculator. For simplicity, all calculators would be configured to operate at a power level associated with the largest reasonable classroom size. Given the wide range of classroom sizes, including auditorium size classrooms, the power needed to communicate can be substantial.

On the other hand, it is extremely desirable in classroom scenarios that the calculator be small and lightweight, with a battery life which lasts at least six months, and preferably more. While laptop computers are frequently recharged, such is not the case for calculators, and if the student calculator expires during class, it would have significant ramifications in how the class was conducted.

A second setting is shown in FIG. 1b. This is an office setting 20 where a wireless network is installed, either by itself or in conjunction with a wired network. In a wireless network, at least some of the computers are connected to the server 26 via a radio frequency link (other computers may be connected to the server using a wired link). In the example illustrated in FIG. 1b, computers 22 have circuitry to transmit signals to a wireless network access point 24 using wireless transmission. In an actual wireless network there would commonly be several wireless network access points located in the office space such that communication with one of the wireless network access points 24 can be made throughout the office. The wireless network access points 24 are wired to the server 26.

Typically, the computers 22 using a wireless connection are either mobile computers, or computers for which a wired connection is inconvenient. Other computers 28 may be hardwired to the server 26.

Wireless networks provide many advantages. Most importantly, a user with a portable computer can remain on the network while moving about the office hallway and conference rooms. As the user moves within the range of the wireless network, different wireless network access points 24 take over responsibilities for communicating between the moving computer and the server 26.

While power conservation is important for both desktop and portable computers (and other mobile computing electronic devices), it is most important for portable computers, since the wireless communication circuitry can significantly reduce the computer's battery life.

Present wireless communication devices are point radiators which use a simple antennae, such as single ¼ wave antennae, to broadcast RF signals. For an indoor signal beyond eight meters, path loss is proportional to the distance between the devices raised to the 3.6 power, i.e., path loss $d^{3.6}$. To transmit a signal for a distance of thirty meters typically requires about 1.0 mW (milliwatt) of power. A power requirement of this magnitude would exhaust calculator batteries in a matter of weeks of normal use, and noticeably increase the rate of charge depletion in a portable computer battery.

Figures 2A, 2B:
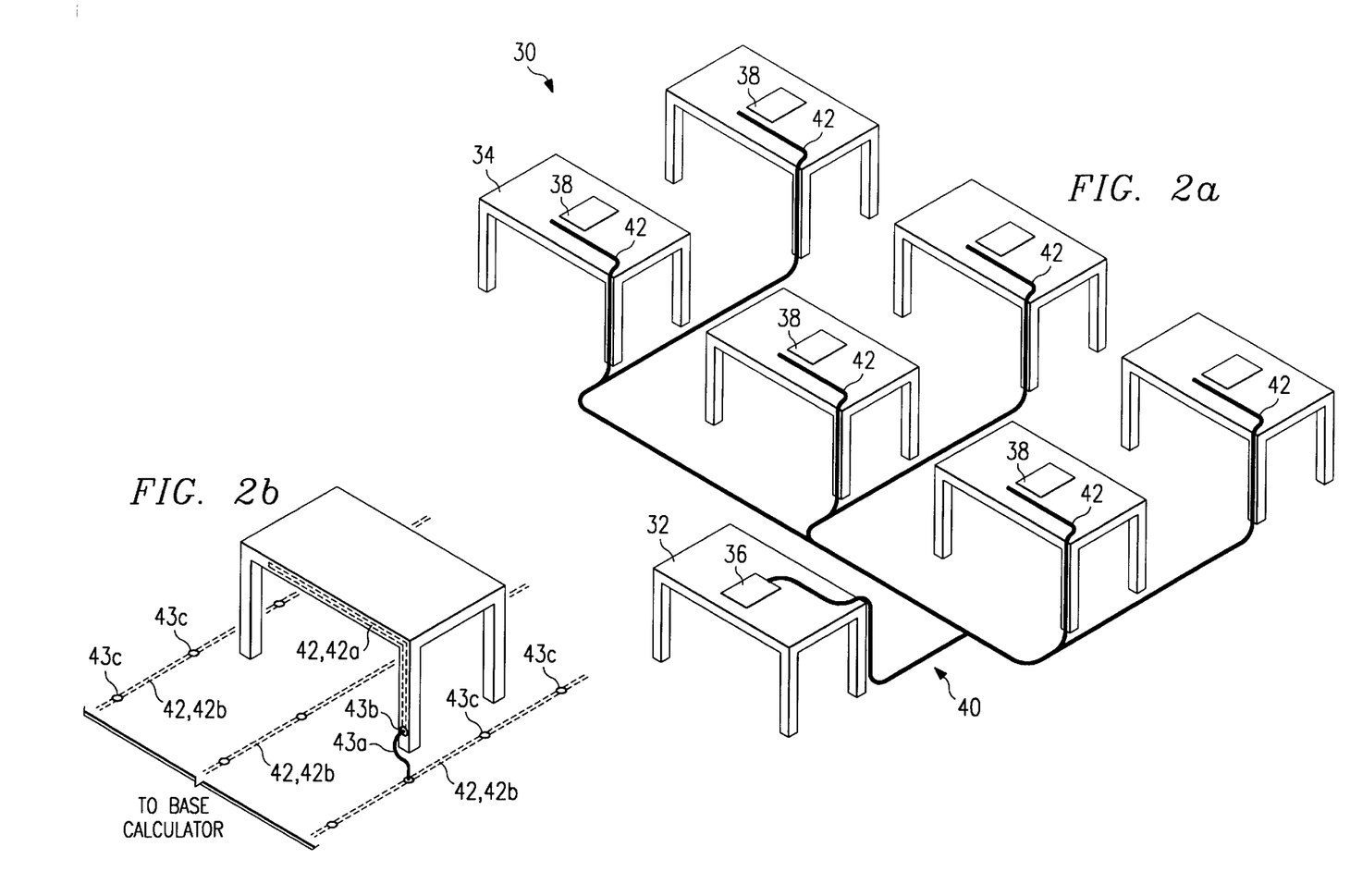
FIGS. 2a and 2b illustrate a classroom setting using a first embodiment of the invention.

FIGS. 2a and 2b illustrate a first embodiment to reduce the power needed to communicate between a mobile computing electronic device and a base station in a classroom situation such as shown in FIG. 1.

In FIG. 2a, a class room setting 30 comprises a teacher's desk 32 and a plurality of student desks 34. The desks 30 and 32 can be arranged in any manner. The teacher's calculator (base calculator 36) is located on the teacher's desk 32 and the student calculators (client calculators 38) are located on the student desks 34. A distributed antenna 40 has segments 42 which extend onto the student desks 34. In the preferred embodiment, the base calculator 36 is hard wired to the antenna 40. The segments 42 may be exposed on an outer surface of the desks 32 and 34 (typically underneath the desktops) or, alternatively, the segments 42 may be embedded into the material used to form the desktops, insofar as the material does not shield the antenna segments 42 from radio frequency signals from the calculators 38.

In operation, the distributed antenna system 40 greatly reduces the power needed for communication between mobile computing electronic devices proximate the antenna segments 42. Typically, in a classroom situation, the client calculators 38 will be used on the student desks 34 and the base calculator 36 will be located on the teacher's desk 32. Accordingly, during communication between calculators, the transmitting calculator 36 will be within 0.5 meters of an antenna segment. Effectively, the distance between the communicating calculators is reduced to 0.5 meters. Assuming that each student calculator 38 would otherwise be required to provide sufficient power to communicate from a distance of 30 meters, the distributed antenna 40 reduces the path loss by 44 dB, a factor of 25,119.

Present day calculators can supply approximately 1200 milliamp hours of power, allowing a communication time of 40 hours for communication at 100 kbps at 30 meters (without the distributed antenna system), since the wireless communication would cause a current drain of approximately 30 milliamps. Using the distributed antenna system 40, the battery life would be increased to allow the six to eight months of normal use desired for a classroom device.

In addition to conserving energy, the distributed antenna system also reduces problems with multi-path distortion which can corrupt wireless transmission. In a normal classroom setting, each receiving calculator 36 or 38 will receive the direct signal, as well as several delayed reflections from walls, ceilings and other objects on the room. The reflected signals are phase shifted from the original signal, and when combined at the point of reception, can cause data errors. For example, if a reflected signal was 180° out of phase with the original signal, the combined signal and reflected signal would cancel out (assuming equal signal strengths).

In the embodiment shown in FIG. 2a, however, each calculator 38 is proximate an antenna segment and preferably within the near field. The strength of the signal near an antenna segment 42 will be many times greater than the signal from a reflection, due to the path loss equation set forth above. Therefore, multipath distortion is virtually eliminated in this embodiment.

Because the calculators 36 and 38 can operate below the FCC threshold for devices in the ISM frequency band, they can use a simple communication modulation/demodulation technique to reduce this cost and to improve energy efficiency.

FIG. 2a illustrates an embodiment where the distributed antenna system 40 is a continuous antenna wire, i.e., all segments 42 are connected together by a wire-to-wire connection. In FIG. 2b, an embodiment is shown where segments 42 are coupled in a user-definable arrangement to allow flexibility in positioning the desks 32 and 34. For example, the segment 42a associated with each desk could be coupled with other segments 42b disposed in the floor using a simple coaxial patch cable 43a between connectors 43b and 43c. The segments 42b in the floor would communicate signals to and from the segments 42a in the desks. A desk 32 or 34 could be relocated by disconnecting a patch cable 43a from a connector 43c and reconnecting at a new connector 43c.

Figure 3:
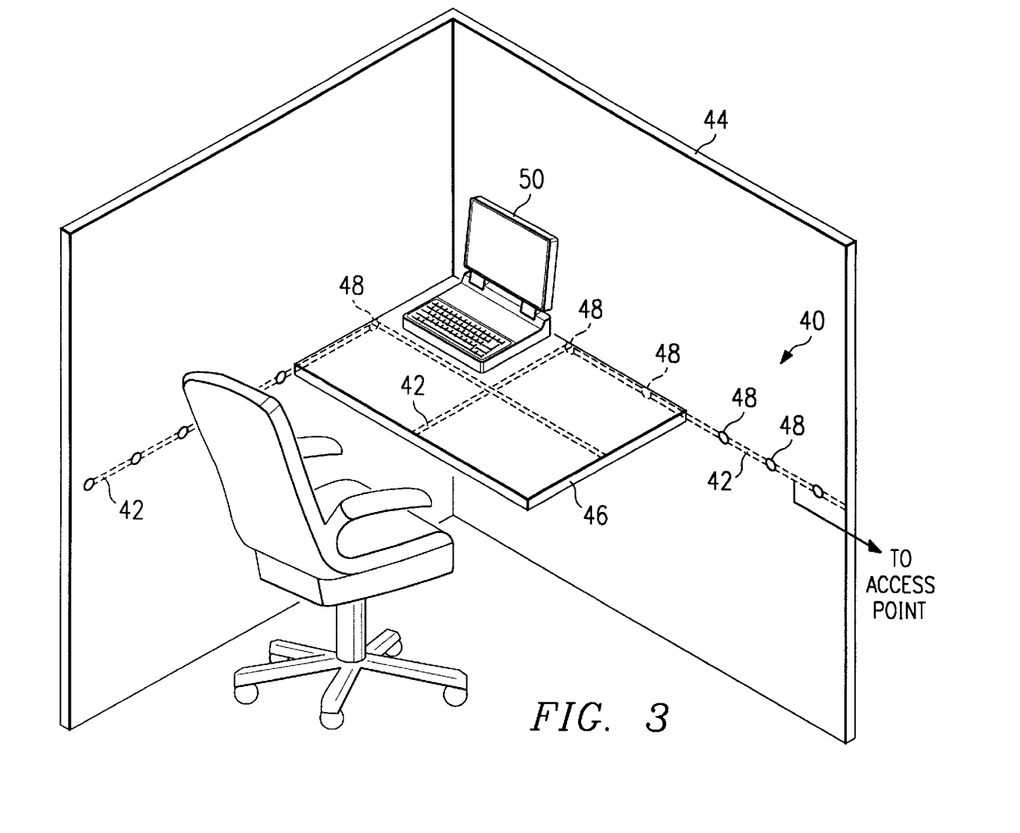
FIG. 3 illustrates an office setting using a second embodiment of the invention.

FIG. 3 illustrates an embodiment similar to those of FIGS. 2a–b using modular furniture. The modular furniture approach is especially desirable in commercial settings. In this embodiment, a distributed antenna system 40 is disposed through modular furniture pieces, such as modular walls 44 and desktops 46, such that the segments 42 are connected as the modular pieces are connected. Contact points 48 are positioned such that as modular pieces are connected, the segments 42 are connected via the contact points 48.

In operation, a mobile computing electronic device, such as a portable computer 50, can communicate through wireless transmission with a base station, such as a wireless network wireless network access point 24, which has a wired connection to the antenna system 40. As described in connection with FIG. 2, the effective distance between the transmitting device and the receiving device is the distance between the transmitting device and the antenna segment 42, since there is virtually no path loss associated with transmission of the signal through the antenna cable 40 (at 2.4 GHz, there is approximately an 8 dB loss over 30 meters, which is small in comparison to the radio frequency path loss in free space).

It is desired to provide a system to communicate at wireline-like data rates (greater than 10 Mbps) and use minimum battery power. The economically feasible spectrum for unlicensed mobile data communications is limited to an 83 MHz wide band at 2.4 GHz. Using the entire band, at very low transmit power levels, enables communication at rates greater than 10 Mbps while enabling frequency re-use in an office area or school building. Because the wireless transmission can occur at extremely low power, the operation of the wireless network occurs at levels well below the FCC threshold level for the ISM frequency band. Therefore, a modulation scheme which is much simpler than the FCC prescribed spread spectrum modulation scheme can be used. Implementing a less complicated modulation scheme, which can use the entire frequency band, reduces the cost of the system and also further reduces the power consumed by wireless communications, since DSPs (digital signal processors) or other complex circuitry is not needed to perform the modulation and demodulation of the signals. While the entire frequency band is used to achieve high data rates, the same band can be used for communication by devices in neighboring vicinities, because the attenuated low power signal from an adjacent area will be masked by thermal noise.

As an example of the energy efficiency of the embodiment of FIG. 3, a typical wireless communication interface for a portable computer uses approximately 1.5 watts of power. Of the 1.5 watts, only 0.2 watts are used for the transmission—the remaining 1.3 watts are consumed by the circuitry for controlling the modulation and demodulation of the signal. By reducing the complexity of the modulation technique, much of the power consumption by the modulation/demodulation circuitry can be eliminated.

The network computer may be freely moved within the office environment, with the antenna segments 42 providing a low loss propagation path for the signals. If the antenna segments 42 mounted on the furniture would be insufficient to cover an area (i.e., if there were large areas of space which were not near an antenna segment), then additional segments may be placed in the carpet, floor tiles, or on the ceiling (see FIGS. 5 and 6).

Because the distributed antenna system 40 greatly reduces path loss, the power needed to transmit a signal from the portable computer, or other mobile computing electronic device, in a commercial environment can be greatly reduced. Accordingly, the battery power of a portable computer will last longer. Further, as described in connection with FIG. 2, the problems associated with multi-path distortion are virtually eliminated, since transmitted signals to the receiving device will be emitted from the antenna segments at practically full strength (the minimum strength required), while reflected signals will be significantly attenuated (masked by thermal noise).

It should be noted that while the embodiment of FIG. 3 illustrates modular furniture designed with integral antenna segments, the antenna system could be retrofitted to any office environment by adhering the antenna segments 42 beneath desktop and connecting the segments together.

As stated above, the use of the distributed antenna system 40 can reduce the number of access points needed in a wireless network system, because the range can be increased to the length of the distributed antenna 40. In some instances, it may be desirable to increase the number of access points in order to shift complications with multiple devices simultaneously accessing the network through a single access point 24. In cases of simultaneous access to a single access point, one or more computers must wait. Using access points dedicated to individual offices, the problem of simultaneous access is shifted from the access points 24 to the hard-wired ethernet level, which has a much higher bandwidth.

In the embodiment shown in FIG. 3, each individual office in an office space could have a dedicated distributed antenna system 40 and a dedicated access point 24, since the power of the wireless transmissions from the portable computer within that office can be made low enough so that they will only be received by the dedicated access point coupled to the dedicated distributed antenna system 42 within the individual office. Access points 24 in adjacent offices would not receive the signal due to the path loss attributable to the distance to reach an adjacent antenna system and losses through the office wall.

In operation, while in an individual office, the user's computer 50 would be handled by the office's dedicated access point. When the user is in common areas outside of an office, one or more access points 24 could be coupled to respective distributed antenna systems 40 to handle multiple computers. Accordingly, higher aggregate communication bandwidth is accomplished.

While increasing the number of access points may appear to increase costs, individual access points using a simple modulation/demodulation technique, and which do not need to negotiate conflicts between multiple devices, could result in superior performance at a lower cost.

Figure 4:
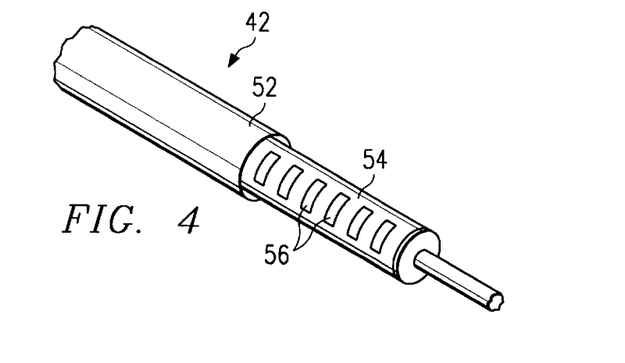
FIG. 4 illustrates a cable used for a distributed antenna system.

FIG. 4 illustrates the wire used for the antenna segments 42. The antenna segments 42 are formed, at least in the part proximate the mobile computing electronic device, from a "lossy cable". A lossy cable 52 has shielding 54 (outer conductor) with holes 56 formed therethrough. The shielding 54 surrounds a foam core 58 covering the inner conductor 60. Such cables can be obtained from the Andrew Corporation of Orland Park, Ill., under the RADIAX brand. The lossy cable allows signals to pass to and emit from the inner conductor 60 in a uniform manner along the cable, while limiting signal losses along the inner conductor. Portions of the distributed antenna system 42 which will not be proximate a mobile computing device can be made of a shielded cable, i.e., a cable having a shielding without holes which is nearly lossless (8 dB over 30 meters at 2.4 GHz).

Figure 5:
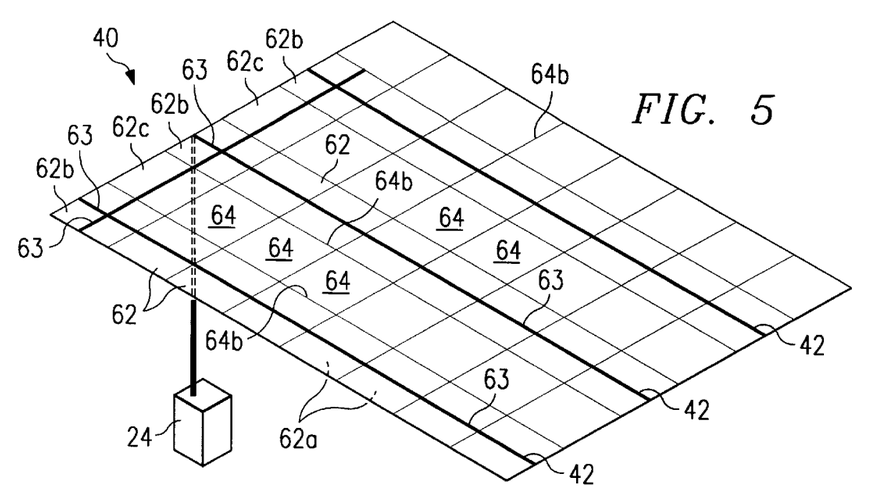
FIG. 5 illustrates a third embodiment of the invention using ceiling tiles to form the distributed antenna system.

FIG. 5 illustrates a third embodiment where the distributed antenna system 40 is disposed on or in ceiling tiles. In this embodiment, the distributed antenna system 40 is formed on wired ceiling tiles 62, such as those commonly used in office environments. Each antenna-wired ceiling tile 62 provides a length of antenna wire for forming a portion of the distributed antenna system 42. Non-wired ceiling tiles 64 can also be used to form the ceiling where an antenna is not needed. The ceiling tiles 62 and 64 are held in place by supports 66. An access point 24 is connected to the antenna system 40 by physical connection.

In operation, the wired ceiling tiles 62 have different configurations to form a distributed antenna system 42 of a desired configuration. For example, wired ceiling tiles 62a incorporate an antenna wire which runs the length of the ceiling tile, where ceiling tiles 62b incorporate connected length-wise and width wise antenna wires. Ceiling tiles 62c incorporate width-wise antenna wires. Other configurations, such as diagonally aligned antenna wires, and 90° angled antenna wires could also be used. The antenna wires are typically formed on the upper surface of the ceiling tiles, so that the antenna wires are not exposed.

In addition to the different layout configurations discussed above, ceiling tiles 62 could be formed using both lossy cable, at points where transmission and reception are desired, and shielded cable, to provide transmission of the signal with virtually no loss in strength in vicinities where a mobile computing electronic device will not be transmitting or receiving data.

The embodiment shown in FIG. 5 has the advantage that the distributed antenna system can be formed quickly and inexpensively to most existing commercial settings and to all new construction by simply using the wired ceiling tiles 62. In this embodiment, the effective distance between a mobile electronic device and an access point would equal the distance between the device and the nearest segment 42 in the ceiling, which should generally be within eight feet. Assuming a range of forty feet for a typical wireless network access point, the distributed antenna system 42 will reduce the power needed to transmit data by a factor of $(40/8)^{3.6}$= 328.

While the distributed antenna system of FIG. 5 is described in connection with commercial office space, it can also be used in other settings, such as classrooms, with a significant reduction in path loss compared to the prior art.

Figure 6A:
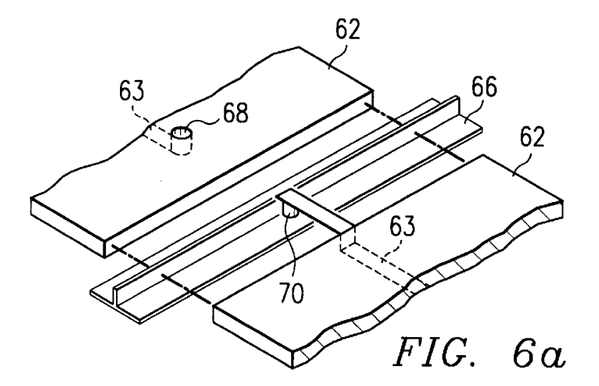
FIG. 6a and 6b illustrate connectors for connecting antenna segments of adjacent ceiling tiles.

FIG. 6a illustrates a first embodiment of a connector which can be used to connect antenna wires 63 as the ceiling tiles are placed on the support members 66. In this embodiment, the ends of the antenna wire 63 on the ceiling tiles 62 are terminated with either a female contact 68 or a male contact 70. As the ceiling tiles 62 are placed on the supports, the male contact extends over the support 66 and into the female contact. It should be noted many other methods could be used to automatically connect adjacent ceiling tiles as they are placed on the support members 63.

Figure 6B:
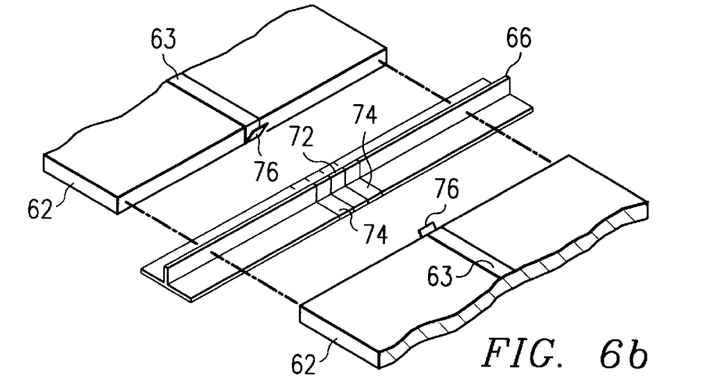

FIG. 6b illustrates a second embodiment of a connector which can be used to connect antenna wires 63 as the ceiling tiles are placed on the support members 66. In this embodiment, support members 66 have conducting regions 72, surrounded by dielectric regions 74 (not necessary if the support members themselves are formed of a dielectric material such a plastic). The antenna wires 63 are terminated with conducting spring clips 76 which create a firm contact with conducting regions 72 when the ceiling tiles 62 are placed on the support members 66.

In operation, as ceiling tiles 62 are placed in the support members 66, the conducting regions 72 form a physical low resistance connection between the antenna wires 63 associated with adjacent ceiling tiles 62. Thus, a desired antenna pattern can be easily implemented or changed simply by placing selected ceiling tiles 62 in the support members 66.

The embodiments shown in FIGS. 2–6 provide significant advantages over the prior art. The power requirement reduction afforded by the distributed antenna system significantly reduces the power used by a portable computer or other mobile computing electronic device to communicate using a wireless transmission. Further, the distributed antenna system 42 eliminates the effect of obstructions between a portable computer and an access point which can block communications. Another advantage of the distributed antenna system 42 is that the number of wireless network access points is greatly reduced, since the distance between a mobile computing electronic device and a network base station is effectively the distance between the mobile computing electronic device and the nearest antenna segment 42, regardless of the physical distance between the base station and the mobile computing electronic device. In classroom situations, the distance between the student calculators and the teacher's calculator can be any length, because the effective distance between the calculators is the distance between the calculators and the nearest antenna segment 42.

While the present invention has been shown in particular settings, it should be noted that the distributed antenna can be used to improve communications between electronic devices in many different situations. For example, while the embodiments show the portable computer connected to a local area network server (via an access point), the distributed antenna could also be used to couple a portable computer to a docking station or an in-office computer.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

What is claimed is:

1. A wireless network comprising:
   a plurality of mobile electronic devices having circuitry for receiving and sending data by wireless communication signals;
   a plurality of furniture pieces other than said mobile electronic devices;
   a distributed antenna system to provide a low loss propagation path for wireless communication signals, said system comprising at least one antenna segment proximate at least one of said furniture pieces; and
   at least one of said electronic devices proximate said distributed antenna system.

2. The wireless network of claim 1 wherein said antenna segments coupled to said furniture pieces comprise first antenna segments and said distributed antenna system further comprises second antenna segments coupled to said first antenna segments.

3. The wireless network of claim 2 wherein said first antenna segments are physically connected to an associated second antenna segment.

4. The wireless network of claim 2 wherein said first antenna segments are coupled to associated second antenna segment via a connector.

5. The wireless network of claim 4 wherein said first antenna segments are coupled to said associated second antenna segment using a patch cable.

6. The wireless network of claim 2, wherein said second antenna segments are coupled to a floor.

7. The wireless network of claim 1 wherein said distributed antenna system is coupled to a base electronic device.

8. The wireless network of claim 1 wherein ones of said mobile electronic devices are portable computers.

9. The wireless network of claim 8 wherein said distributed antenna system is coupled to a network access point.

10. The wireless network of claim 8 wherein said furniture pieces are modular furniture pieces.

11. The wireless network of claim 1 wherein ones of said mobile electronic devices are calculators.

12. The wireless network of claim 11 wherein said furniture pieces are student desks.

13. The wireless network of claim 11 wherein said distributed antenna system is coupled to a teacher calculator.

14. A computer network comprising:
    a plurality of antenna segments located in a work area, each antenna segment located proximate a respective furniture piece to provide a low loss propagation path for wireless communication signal;
    at least one access point coupled to at least one of said antenna segments; and
    at least one mobile electronic device proximate at least one of said antenna segments, having capability to transmit wireless signals at low power levels such that wireless transmission by a device to an antenna segment in said work area does not interfere with communications with other antennas in other work areas adjacent said work area.

15. The computer network of claim 14 wherein said antenna segments comprise segments of lossy cable.

16. The computer of claim 14 wherein said mobile electronic device comprises a portable computer.

17. A wireless network comprising:
    a plurality of mobile electronic devices having circuitry for receiving and sending data by wireless communication signals;
    a plurality of work surfaces;
    a distributed antenna system to provide a low loss propagation path for wireless communication signals, said system comprising at least one antenna segment proximate at least one of said work surfaces; and
    at least one of said electronic devices proximate said distributed antenna system.

18. A computer network comprising:
    a plurality of antenna segments located in a work area, each antenna segment located proximate a respective work surface to provide a low loss propagation path for wireless communication signal;
    at least one access point coupled to at least one of said antenna segments; and
    at least one mobile electronic device proximate at least one of said antenna segments, having capability to transmit wireless signals at low power levels such that wireless transmission by a device to an antenna segment in said office does not interfere with communications with other antennas in other work areas adjacent said work area.

* * * * *